United States Patent [19]
Haitz

[11] Patent Number: 5,971,545
[45] Date of Patent: Oct. 26, 1999

[54] LIGHT SOURCE FOR PROJECTION DISPLAY

[75] Inventor: Roland H Haitz, Portola Valley, Calif.

[73] Assignee: Hewlett-Packard Company, Palo Alto, Calif.

[21] Appl. No.: 08/882,243

[22] Filed: Jun. 25, 1997

[51] Int. Cl.⁶ .................................................. G03B 21/14
[52] U.S. Cl. .............................. 353/31; 353/37; 349/69
[58] Field of Search .............................. 353/31, 33, 34, 353/37; 349/61, 69; 345/46, 44; 348/742, 801

[56] References Cited

U.S. PATENT DOCUMENTS

| | | | |
|---|---|---|---|
| 4,870,268 | 9/1989 | Vincent et al. | 250/226 |
| 5,024,524 | 6/1991 | Flasck | 353/31 |
| 5,359,345 | 10/1994 | Hunter | 349/69 |
| 5,398,086 | 3/1995 | Nakano et al. | 353/31 |
| 5,467,154 | 11/1995 | Gale et al. | 353/119 |
| 5,555,035 | 9/1996 | Mead et al. | 353/31 |
| 5,557,353 | 9/1996 | Stahl | 353/37 |
| 5,632,545 | 5/1997 | Kikinis | 353/31 |
| 5,635,997 | 6/1997 | Lewis | 353/31 |
| 5,668,611 | 9/1997 | Ernstoff et al. | 348/771 |

FOREIGN PATENT DOCUMENTS

| | | |
|---|---|---|
| 573925A1 | 6/1993 | European Pat. Off. . |
| WO97/16679 | 5/1997 | WIPO . |

*Primary Examiner*—William Dowling
*Attorney, Agent, or Firm*—Pamela Lau Kee

[57] ABSTRACT

A compact and energy efficient projection display can be made by starting with relatively pure red, green, and blue light sources. The output beams of the colored light sources are received by at least one spatial light modulator. The modulated output beams are collimated and combined. A projection lens receives the collimated and combined output beams and directs them towards a projection screen. All of the above may be contained in a housing to provide a compact and lightweight projection display.

11 Claims, 3 Drawing Sheets

LIGHT SOURCE FOR PROJECTION DISPLAY

FIELD OF THE INVENTION

The invention is directed towards the field of projection displays. In particular, he invention relates to the manufacture of rear projection flat panel displays.

BACKGROUND OF THE INVENTION

Real image displays can be separated into three categories: cathode ray tubes (CRT), flat panel displays, and projection displays. Currently, CRT displays range from 1–40 inches along the image diagonal. These displays have good image quality and can be manufactured economically. The shape of the display requires a depth that can exceed the length of the image diagonal for high resolution graphic displays. The displays are bulky, especially for sizes above 20 inches because the wall thickness of the glass must be increased to withstand the atmospheric pressure. CRTs are popular in the desktop monitor market where the common length of the image diagonal is 14–17 inches.

Flat panel displays are used in many portable applications. They are thin and light in weight but have an image quality that is inferior to the CRT. At this time, the majority of displays are used in applications requiring 2–12 inches along the image diagonal. Flat panel displays are more costly to manufacture than the CRTs.

As a result, display applications that require an image size above 40 inches are dominated by projection displays: either front or rear. Both technologies can create an image by one of two methods: using three small high brightness monochromic CRTs for red, green, and blue (RGB) or creating a color image via a spatial light modulator. These projection systems have low image brightness and are costly to manufacture.

It is not economical to reduce the conventional rear projection display to 17–20 inches along the image diagonal. The cost of the light valve is dominated by the drive circuitry. To illustrate, the drive circuitry of an XGA display (768×1024×3) is approximately $120 regardless of the screen size. A 70W metal halide arc lamp capable or producing 5000 lumens with its corresponding power supply, ballast, and hot reignition capability are required. The total cost is prohibitive and unattractive compared to the OEM cost of a 17 inch CRT.

SUMMARY OF THE INVENTION

A compact, light weight, and energy efficient projection display can be made by starting with relatively pure red, green, and blue light sources. The output beams of the colored light sources are received by at least one spatial light modulator. The modulated output beams are collimated and combined. A projection lens receives the collimated and combined output beams and directs them towards a projection screen. All of the above may be contained in a housing to provide a compact and lightweight projection display.

DETAILED DESCRIPTION OF THE PREFERRED EMBODIMENTS

The present invention is a light weight and compact projection display that is based on a spatial light modulator, typically a 1 cm$^2$ CMOS IC that is in direct contact with a ferro-electric liquid crystal material. Light transmitted through the liquid crystal material will rotate as a function of its plane of polarization with respect to the local surface voltage of the IC. Illuminating the LC/IC cell with consecutive flashes of red, green, or blue light from three separate LEDs creates a color-sequential image of the surface voltage of the IC.

The address circuitry is buried in the 1 cm$^2$IC. All display information is sent to the IC on one or several high speed I/O lines. The IC/LCD combination is equivalent to a reflective active matrix liquid crystal display (AMLCD) light valve at much lower cost and higher performance. For instance, the transmissive design of an AMLCD light valve blocks 60% of the light due to the shadowing of metal lines and transistors. In contrast, the reflective cell has estimated losses of only 20%, mainly reflective losses from the aluminum pads covering the IC surface. By using sequentially strobed RGB light sources instead of a white light source, the more than 75% light loss in the color filter is also eliminated.

The present invention, a rear projection display using a spatial modulator and three LED power sources can be optically efficient.

TABLE 1

|  | Conventional Design (Prior Art) | LED Design |
| --- | --- | --- |
| Collimation | 40% | 60% |
| Polarizer | 50% | 50% |
| Rect/Circular Conversion | 70% | 70% |
| Color Filters | 25% | 100% |
| Valve Aperture | 40% | 80% |
| Misc. Refl./Absorption | 60% | 60% |
| Total | 0.8% | 10% |

Table 1 illustrates the optical efficiency of a rear projection system based on conventional design and LED design of the present invention. Flux exiting the front surface of the screen, $\phi_{exit}$, is defined as follows:

$$\phi_{exit}=BA\Omega$$

A is the area of the screen and B is the brightness of the desired Lambertian light distribution. If the screen has a gain g of 1.5 by reducing the angular distribution below a Lambertian distribution, then the exiting flux is:

$$\phi_{exit}=BA\Omega/g$$

Figure 1:
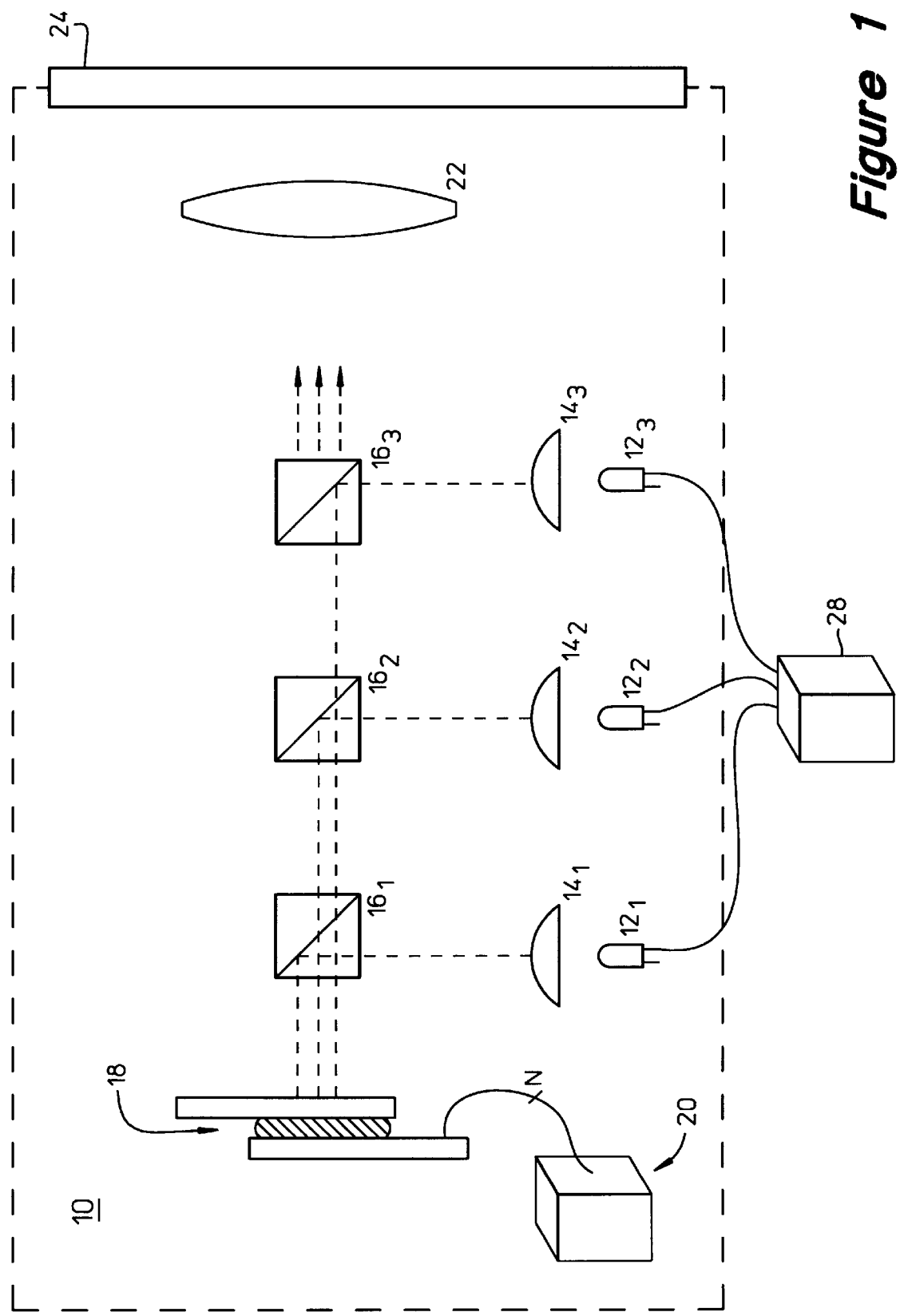
FIG. 1 illustrates a preferred embodiment of the projection display.

For a high resolution desktop monitor, the brightness required is 100 cd/m$^2$. A 17 inch monitor has an image area of 25×30 cm$^2$ or A=0.075m$^2$. Because a desktop monitor may have a smaller viewing angle than a comparable sized television, the screen gain may be selected to be g=2. For these assumptions, the exit flux is computed to $\phi_{exit}$=12 lm. For an optical system design having an overall efficiency of 10%, a source flux of $\phi_{source}$=120 lm is required. This flux may be distributed over all three sources as follows:
Red 30 lm
Green 75 lm
Blue 15 lm FIG. 1 illustrates a preferred embodiment of a projection display 10 that includes three light emitting diodes 12$_1$, 12$_2$, $12_3$, emitting a red, green, and blue light beam, respectively. Each light beam is received by a collimator $14_1$, $14_2$, $14_3$. Each collimated light beam passes through a polarizing beam splitter $16_1$, $16_2$, $16_3$. A spatial light modulator 18, having M×N pixels, modulates the split beams. The spatial light modulator 18 is controlled by a display driver 20. A projection lens 22 receives the modulated beams and directs them towards a projection screen 24, positioned at the front of the housing 26. A sequence controller 28, attached to the three light sources, controls the red, green, and blue light beams. The spatial modulator and the three light sources are connected to a power supply (not shown).

The light emitting diode may be a laser diode. In particular, the green light source may be a frequency-doubled Nd:YAG laser. Alternatively, an array or multiple light emitting diodes may be used for each color. It is preferable that the array include no more than 10 LEDs and that the array has a diameter no greater than 3 mm. An optional reflector may surround the array while an immersion lens receives the light from the array to pre-collimate the light into a solid angle of 3 steradians or less. The red, green, and blue light emitting diodes, in combination, have a luminous flux of 10–1000 lm. It is preferred that the approximate flux ratio is 65% green, 25% red, 10% blue light and an apparent source size, after magnification of less than 5 mm in diameter.

The housing may optionally include at least two folding mirrors to receive the red, green, and blue light beams and to fold the red, green, and blue light beams. The folding mirrors allow the housing to be compact.

In this embodiment, the color subframes are sequential.

Figure 2:
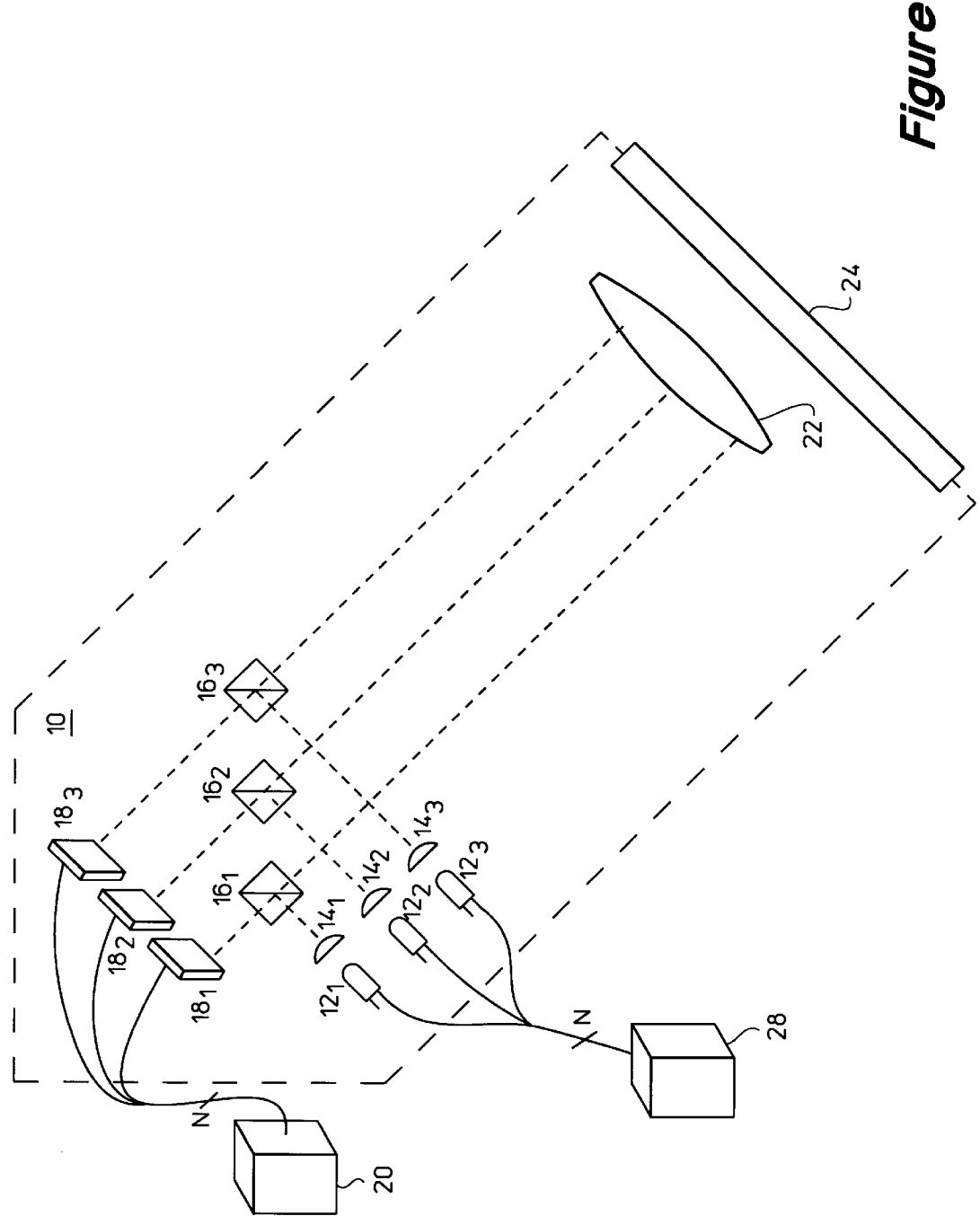
FIG. 2 illustrates an alternate embodiment of the present invention.

FIG. 2 illustrates another embodiment of the present invention. There are three spatial modulators $18_1$, $18_2$, $18_3$, one for each light beam to allow for parallel color subframes. In this embodiment, the color subframes are parallel.

Figure 3:
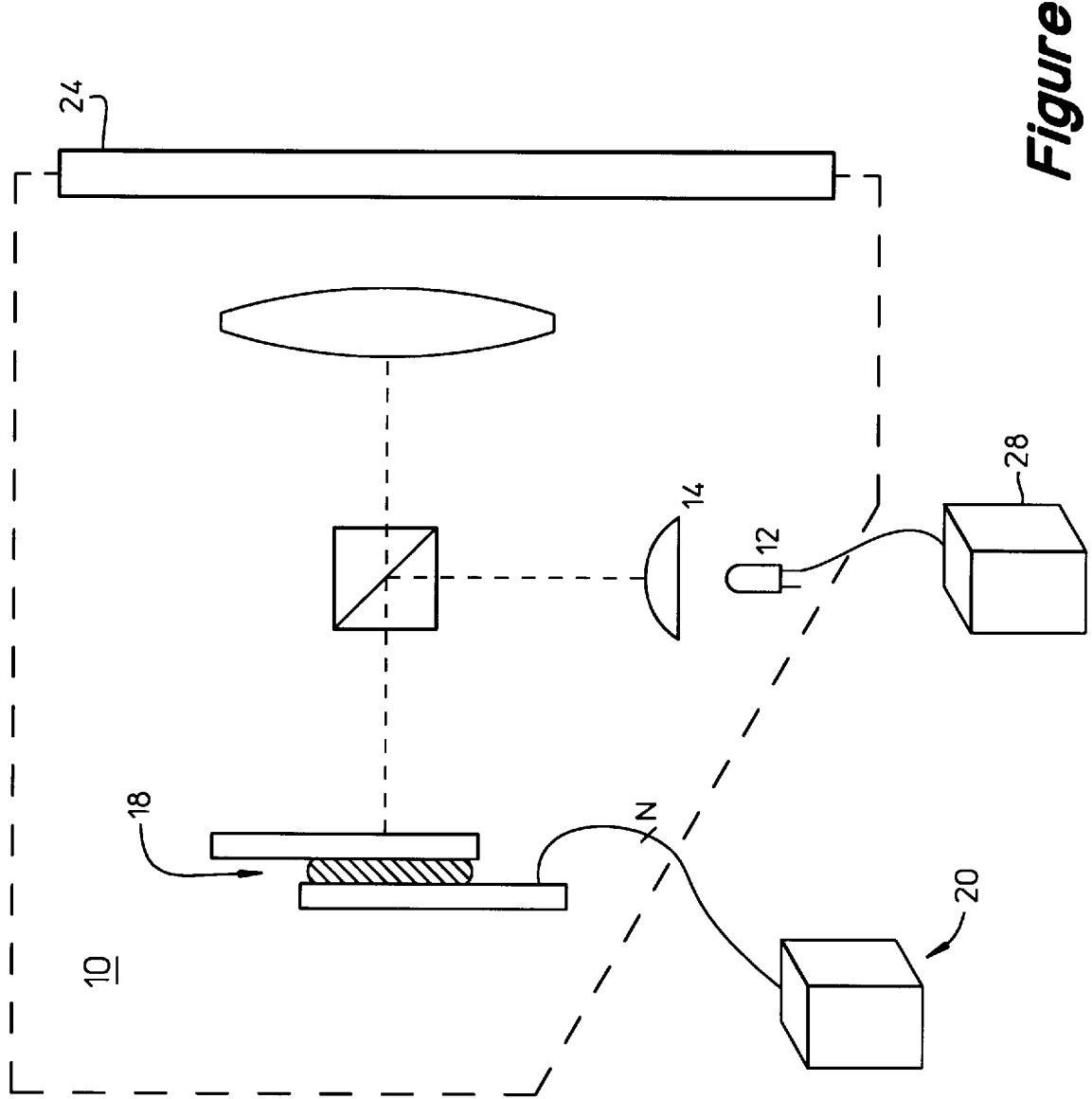
FIG. 3 illustrates another embodiment of the present invention.

FIG. 3 illustrates another embodiment of the present invention. The multiple light emitting diodes shown in FIG. 1 are replaced by a single light source 12. The single light includes light emitting diodes on a unitary substrate that emit red, green, and blue light. There is only one light path in the system as contrasted to the embodiments shown in FIGS. 1 and 2.

I claim:

1. A projection display comprising:
   a housing;
   red, green, and blue light sources, within the housing, each light source includes,
      at least one light emitting diode that emits a light beam,
      a collimator, optically connected to the light unit, producing a collimated light beam, and
      a beam splitter, optically connected to the collimator;
   wherein any one of the red, green, and blue light sources is an array of N light emitting diodes on a unitary substrate, where N≦10, the array having a diameter of 3 mm;
   a spatial light modulator, within the housing, having M×N pixels, optically connected to the beam splitters of the red, green, and blue light units;
   a projection lens, within the housing, optically connected to the spatial light modulator, operative to focus the red, green, and blue light beams;
   a projection screen, within the housing, optically connected to the projection lens;
   a sequence controller, within the housing, connected to the spatial light modulator, being operative too generate color subframes; and
   a power supply, within the housing, connected to the spatial modulator and the red, green, and blue light units.

2. A projection display, as defined in claim 1, wherein any one of the red, green, and blue light sources further comprises:
   a reflector surrounding the array of light emitting diodes; and
   an immersion lens, receiving light from the array of light emitting diodes, operative to pre-collimate the light into a solid angle of 3 steradians or less.

3. A projection display, as defined in claim 2, wherein the array of light emitting diodes has an apparent source size less than 5 mm in diameter.

4. A projection display, as defined in claim 1, wherein any one of the red, green, and blue light sources further comprises:
   a reflector that surrounds the light emitting diode; and
   an immersion lens, receiving light from the light emitting diode, operative to pre-collimate the light into a solid angle of 3 steradians or less.

5. A projection display, as defined in claim 4, wherein the light emitting diode has an apparent source size, after magnification, less than 5 mm in diameter.

6. A projection display, as defined in claim 1, wherein the red, green, and blue light emitting sources have a combined luminous flux of 10–1000 lm with an approximate ratio of 65% green, 25% red and 10% blue light.

7. A projection display comprising:
   a housing that contains,
      a light unit, being operative to generate a white light comprised of 25% red, 60% green, and 15% blue light, that includes,
         at least one red, one green, and one blue light source on a unitary substrate, wherein the red, green, and blue light sources are independently switched, and
         a collimator, optically connected to the red, green, and blue light source, producing collimated red, green, and blue beams;
      a beam splitter, receiving the collimated red, green, and blue beams, operative to output split red, green, and blue beams;
      a spatial light modulator, having M×N pixels, optically connected to the beam splitter;
      a projection lens, optically connected to the spatial light modulator, being operative to focus the red, green, and blue beams;
      a drive circuit, connected to the spatial light modulator, being operative to generate color subframes; and
      a power supply, connected to the spatial light modulator and the light unit.

8. A projection display comprising:
   a housing that contains,
      N red, green, and blue light sources are on a unitary substrate, wherein N is less than 10 and the unitary substrate has a diameter of ≦3 mm
      a collimator, optically connected to the red, green, and blue light sources, producing collimated red, green, and blue beams;
      a beam splitter, receiving the collimated red, green, and blue beams, operative to output split red, green, and blue beams;
      a spatial light modulator, having M×N pixels, optically connected to the beam splitter;

a projection lens, optically connected to the spatial light modulator, being operative to focus the red, green, and blue beams;

a drive circuit, connected to the spatial light modulator, being operative to generate color subframes; and a power supply, connected to the spatial light modulator and the light unit.

9. A projection display, as defined in claim 8, wherein the red, green, and blue light sources further comprise:

a reflector that surrounds the array of light emitting diodes; and an immersion lens, receiving light from the array of light emitting diodes, operative to pre-collimate the light into a solid angle of 3 steradians or less.

10. A projection display, as defined in claim 9, wherein the array of light emitting diodes has an apparent source size, after magnification, of less than 5 mm in diameter.

11. A projection display, as defined in claim 10, wherein the red, green, and blue light sources have a combined luminous flux of 10–1000 lm with an approximate ratio of 65% green, 25% red and 10% blue light.

* * * * *

UNITED STATES PATENT AND TRADEMARK OFFICE
CERTIFICATE OF CORRECTION

PATENT NO : 5,971,545
DATED : October 26, 1999
INVENTOR(S) : Haitz

It is certified that error appears in the above-identified patent and that said Letters Patent is hereby corrected as shown below:

Column 1, (line 7), delete "he" and insert therefor --the--.
Column 1, (line 43), delete "or" and insert therefor --of--.

IN THE CLAIMS

Column 3, (line 66), delete "too" and insert therefor --to--.
Column 6, (line 7), delete "claim 10" and insert therefor --claim 8--.

Signed and Sealed this

Twenty-seventh Day of March, 2001

Attest:

NICHOLAS P. GODICI

Attesting Officer

*Acting Director of the United States Patent and Trademark Office*